(12) United States Patent
Skillman

(10) Patent No.: US 6,762,784 B2  
(45) Date of Patent: Jul. 13, 2004

(54) METHOD OF REDUCING ELECTROMAGNETIC EMISSIONS (EMI) FROM LED BAR SYSTEMS

(75) Inventor: Gary R. Skillman, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 170 days.

(21) Appl. No.: 09/683,537

(22) Filed: Jan. 16, 2002

(65) Prior Publication Data

US 2003/0133715 A1 Jul. 17, 2003

(51) Int. Cl.$^7$ ................................................ B41J 2/47
(52) U.S. Cl. ................................... 347/239; 347/255
(58) Field of Search ............................. 347/238, 239, 347/255, 130, 135, 237; 375/130; 358/1.16, 409

(56) References Cited

U.S. PATENT DOCUMENTS

| | | | |
|---|---|---|---|
| 5,233,337 A | 8/1993 | Takahashi | 345/82 |
| 5,262,658 A | 11/1993 | Jankowski | 257/88 |
| 5,576,599 A | 11/1996 | Nourrcier | 315/85 |
| 5,631,920 A | 5/1997 | Hardin | 375/130 |
| 5,668,937 A * | 9/1997 | Shimizu | 358/1.16 |
| 5,867,524 A | 2/1999 | Booth et al. | 375/130 |
| 6,240,123 B1 * | 5/2001 | Zhang et al. | 375/130 |
| 6,476,845 B2 * | 11/2002 | Luman | 347/237 |
| 6,525,842 B1 * | 2/2003 | Nakajima et al. | 358/409 |

FOREIGN PATENT DOCUMENTS

| | | |
|---|---|---|
| EP | 0504575 A2 | 9/1992 |
| EP | 0739089 A2 | 10/1996 |

* cited by examiner

*Primary Examiner*—Hai Pham  
(74) *Attorney, Agent, or Firm*—Oliff & Berridge, PLC

(57) ABSTRACT

Light emitting diode (LED) bar systems have large surface areas and extensive cabling that carry high frequency clocks and data. As the process speeds increase, the higher clock and data rates become an electromagnetic interference (EMI) problem. As the U.S. federal government restricts EMI emissions, many have turned to shielding techniques. However, a spread spectrum technique now may also reduce peak EMI amplitudes by distributing the EMI energy over a range of frequencies. The pixel data may be clocked into a LED bar system with a varying frequency to spread the energy over the range of the modulation. The same total energy is still emitted from the system, but the peak energy at any particular frequency is reduced.

20 Claims, 3 Drawing Sheets

METHOD OF REDUCING ELECTROMAGNETIC EMISSIONS (EMI) FROM LED BAR SYSTEMS

BACKGROUND OF THE INVENTION

1. Field of Invention

The present invention relates generally to light emitting diode (LED) bar systems, and more particularly, to a light emitting diode bar system that produces lower measured levels of electromagnetic interference (EMI).

2. Description of Related Art

Generally, a xerography system forms a latent image charge pattern on a uniformly charged or charge-retentive or photo-conductive member possessing dielectric characteristics. Pigmented marking particles are attracted to the latent image charge pattern and develop the image on the photo-conductive member. A receiver, for example a piece of paper or other such medium, comes into contact with the photo-conductive member where an electric field is applied to transfer the marking particle developed image to the receiver from the photo-conductive member. Once the marking particles are transferred to the receiver, the image is fixed by heat and pressure to produce a permanent image upon the receiver.

The photo-conductive member is exposed to radiation in a pattern corresponding to a scanned image, thereby forming the latent image charge pattern. The exposure may be performed optically or electronically. Optically, a reflected light image of the image to be reproduced may be optically focused on the uniformly charged photo-conductive member to bias the charge in an image-wise pattern. Electronically, a light-emitting device, such a light-emitting diode (LED) array, may be activated according to appropriate electrical signals to bias the uniform charge on the dielectric member to form the desired image-wise charge pattern. The individual diodes generate light energy that passes through a fiber optic lens assembly onto the surface of a moving photoconductor with sufficient intensity to locally discharge the surface of the photoconductor and establish a charge pattern on the photoconductor surface that models a desired visual image pattern.

Individual LEDs are low power output devices. A bar system, or an array, of LEDs may be used to increase the output of power and to simplify the design of xerography systems. The LED bar system is fabricated to have the LEDs in a single substrate to produce good optical alignment and minimize the overall assembly.

The individual LEDs are usually arranged in the bar system where each individual LED produces an individual exposed pixel on a moving photoreceptor to an exposure value defined by the video data information applied to the drive circuits of the bar systems. The photorecptor advances in the process direction in order to provide an image by the formation of successive scan lines.

In a color xerographic printer, several LED bar systems may be positioned adjacent to a photoreceptor belt surface and are individually energized to create consecutive image exposures. If two bars are utilized, there is usually one highlight color and one black color. Full color printing uses one bar for each of the basic colors, cyan, magenta, and yellow, and a fourth bar for black.

Typical LED pixel times for high speed printers are on the order of about 10 to about 100 nanoseconds.

An LED bar system uses digital circuits requiring one or more clocks to synchronize the process. For example, individual LEDs in the bar system are turned on or not turned on in response to a signal corresponding to a digital image. The signal processed by the clock allows for the precise timing of activating the individual LEDs of the array to establish a charge pattern on the moving photoreceptor that is identical to the scanned image.

Such digital circuits and LED bar systems are vulnerable to the formation and emanation of electromagnetic interference (EMI). EMI is a measure of the amount of interference an electronic device imposes upon another such device. Typically, the spectral analysis of EMI emissions indicates that EMI emissions have peak amplitudes at harmonics of the clock circuit's fundamental frequency. Thus, the federal government has established maximum allowable emissions of EMI due to the disruption that can be caused to neighboring digital circuits.

In the case of LED printing systems, the LED printer speed is proportional to the amount of EMI emissions. Thus, as the LED printer speeds increase, the emissions of EMI will also increase. The greatest threat of EMI emissions in a LED printing system arises from the actual LED bar array.

Present methods of transferring data into a LED bar system include using massive parallel cabling that connects each pixel to one I/O line. The data rate transfer in such a system is low and does not pose an EMI threat. However, the cabling used is large, bulky, and costly. The cost and bulk of such cabling may be reduced by multiplexing the LED pixels and serially loading the pixel data. The number of data lines and number of pixels multiplexed per line determine the data and clock rates required. The serial connection cables may be more expensive because of the shielding required. There are design tradeoffs in using either parallel or serial cabling to reduce EMI emissions.

Compliance with regulations for the reduction of EMI emissions can be costly. Past attempts to reduce EMI has included suppression measures and shielding. There have even been successful attempts of precise routing of signal traces on printed circuit boards to minimize loops and other potential radiation structures. Ultimately, each of these methods has an increased financial and design burden.

A technique being examined and used in reducing EMI emissions within personal computers is a spread spectrum technique. This technique may be a cost-effective means to control clock-generated EMI emissions in personal computers. The technique reduces EMI emissions by varying or modulating the frequency of clocks in the personal computer. The EMI emissions are then spread over a range of frequencies rather than being concentrated at a particular frequency and its harmonics. The same overall EMI energy is still emitted, but it occurs over a range of different frequencies.

The current techniques of shielding and cabling LED bar systems to reduce EMI emissions are bulky and expensive. A more cost effective technique of reducing EMI emissions from LED bar systems used in image reproduction (i.e., xerographical devices) is needed.

SUMMARY OF THE INVENTION

In view of the foregoing background, it is an object of the present invention to reduce the EMI emitted from an LED bar system in a cost effective manner.

These and other objects are achieved by the present invention, which embodiments reduce EMI emissions from an LED bar system by modulating the clock signal slightly in frequency. This is known in the art as spread spectrum. The resulting spectrum of a modulated clock signal will have a lower peak value because the energy is distributed among neighboring frequencies. The overall energy emitted from the system is the same, but the peak energy at any particular frequency is reduced.

In embodiments, the present invention also comprises a light emitting diode bar system, and a clock circuit for generating a clock output signal, and a spread spectrum clock generator for generating a clock output signal with reduced peak electromagnetic interference spectral components. The clock circuit may be coupled to an oscillator and the spread spectrum clock generator. The clock circuit is responsible for the timing of particular signals so the system's functions are properly synchronized. For example, in the present invention, the individual LEDs of the bar system are turned on and/or off in accordance with the clock times generated by the clock circuit.

The oscillator generates a reference frequency signal and the spread spectrum clock generator generates a spread spectrum clock output signal wherein there is a fundamental or central frequency and a reduction in EMI spectral components at harmonics of the fundamental frequency.

BRIEF DESCRIPTION OF THE DRAWINGS

Other features of the present invention will become apparent as the following description proceeds and upon reference to the drawings, in which.

DETAILED DESCRIPTION OF PREFERRED EMBODIMENTS

The present invention will now be described more fully. The invention may be embodied in different forms and need not be limited to the embodiments set forth herein. These exemplary embodiments are provided so that the disclosure will be thorough and complete, and will fully enable one of ordinary skill in the art.

Figure 1:
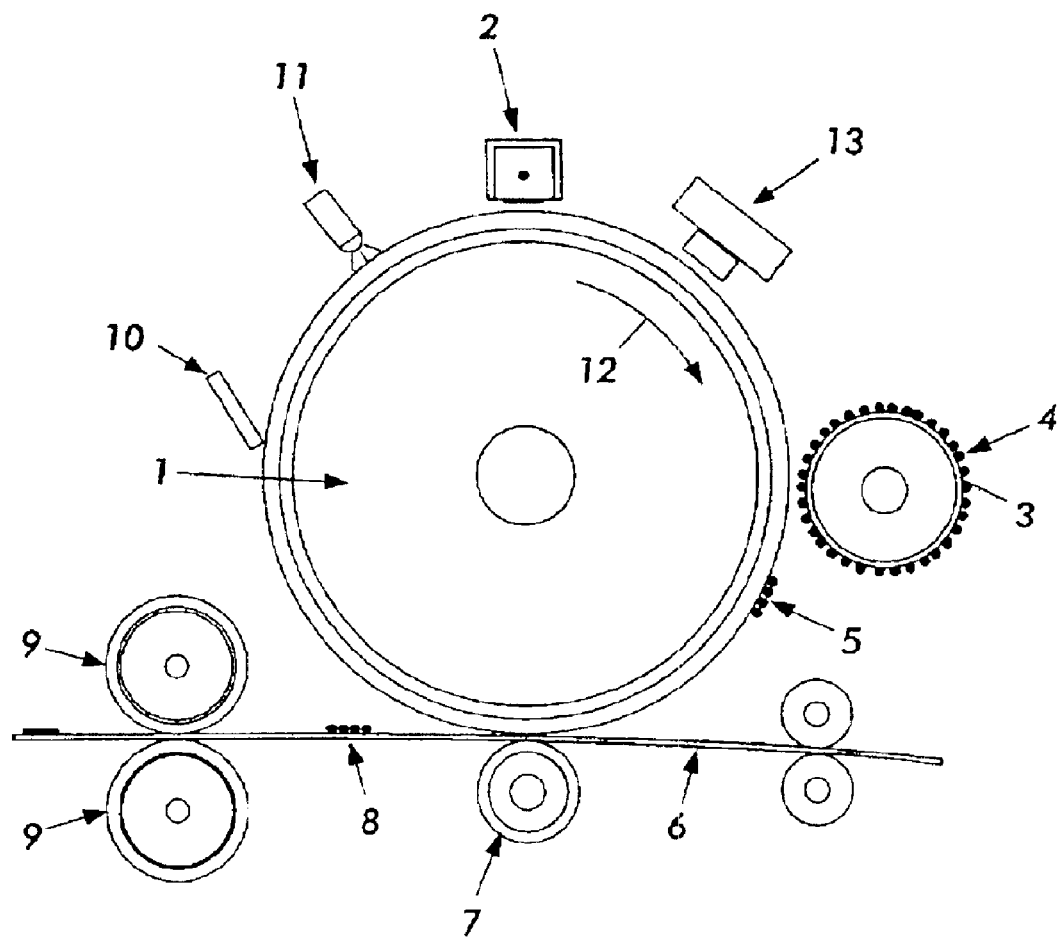
FIG. 1 is a diagram of a typical xerography system.

FIG. 1 represents a typical xerography system. A photoreceptor (1) moving in the direction (12) is electrically charged on its surface by a corotron (2). The charged photoreceptor surface is exposed to light from the LED bar array (13) therein producing a latent image of the original image on the surface of the moving photoreceptor. The photoreceptor surface comes into close contact with a donor roll (3) wherein toner particles (4), charged opposite of the photoreceptor surface, are attracted to the photoreceptor surface to form an image with toner particles (5) on the photoreceptor surface. The photoreceptor surface next comes in contact with a transfer surface (6), for example, paper. The transfer surface is charged by a biased transfer roll (7) to attract the toner particles from the photoreceptor surface to the transfer surface. The transferred toner particles (8) on the transfer surface are then subjected to pressure rollers (9) to fuse the toner particles to the paper. After transferring the toner particles, any non-transferred toner particles are removed from the photoreceptor surface with a cleaning blade (10). The photoreceptor surface is then neutralized with a discharge lamp (11) before beginning the cycle again.

The LED bar system of the present invention comprises at least three primary components. In particular, the bar system comprises a LED bar assembly, a control unit, and a spread spectrum clock generator. A LED array is a single substrate upon which numerous individual LEDs are arranged. Each individual LED of the array forms an individually exposed pixel on a moving photoreceptor by exposing the surface of the photoreceptor with light energy sufficiently intense to establish a charge pattern thereon matching the scanned visual image. The present invention may include one or more LED bar arrays in the LED bar assembly depending upon the application for which the system was designed, i.e., color printing typically has at least four LED bar systems to represent each of black, magenta, yellow, and cyan.

The LED bar system is coupled to a control unit. The control unit includes or is coupled to a data formatting unit and a clock circuit. The clock circuit is required for the synchronization of signals between the individual LEDs in the bar system and the digital circuits. Typically, the individual LEDs are either "on" or "off" in response to a signal received from the control unit that corresponds to a digital image. The "on" or "off" state is controlled by the digital circuits being synchronized by one or more clock circuits. Generally, the clock circuits have a stable rate giving rise to energy emissions at a particular frequency.

The clock circuit of the present invention may be coupled to an oscillator and a spread spectrum clock generator. The oscillator is responsible for supervising or synchronizing microprocessors and/or the clock circuit using a reference frequency signal. In combination, the oscillator and the spread spectrum clock generator vary the clock rates around a nominal frequency. Thus, the energy emissions are not as concentrated at a particular frequency, but are spread across a range of frequencies. The total energy emitted is the same as when the rate was unvaried, but it is not as concentrated at any particular frequency and thus, not as harmful.

The spread spectrum clock generator is preferably comprised of a clock pulse generator and a spread spectrum modulator. The clock pulse generator generates a series of electric clock pulses. Typically, unmodulated clock pulses are rectangular or trapezoidal in shape. This shape would correspond to the peak amplitudes of EMI spectral components at harmonics of the fundamental frequency. The modulated series of clock pulses generated from the clock pulse generator has broader and flatter EMI peak spectral components emitted by the LED bar system.

The spread spectrum modulator works with the spread spectrum clock generator to decrease the peak amplitudes of the EMI spectral components. The reduction in peak amplitudes by the spread spectrum modulator may preferably be performed by modulating the frequency of the clock pulse generator in order to decrease the energy output at a particular frequency. Varying the frequency with time spreads the total energy over a range of modulation, rather than expose one or several particular frequencies with the majority of the energy output. When modulated, the same total energy emitted is identical to the system when unmodulated, however, the peak energy at any particular frequency is actually reduced. In the spread spectrum technique, the modulator will continuously be modulating the frequency. The spread spectrum modulator is preferably a profile modulator for modulating the clock pulse generator with a periodic waveform.

Figure 2:
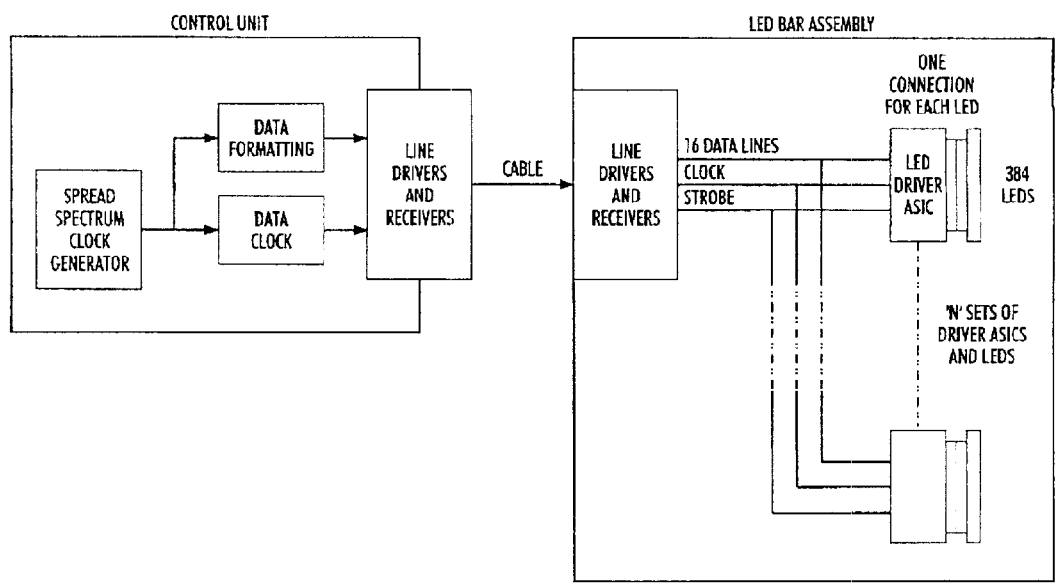
FIG. 2 is a block diagram describing one embodiment wherein the spread spectrum clock source is connected to the control unit of the device.

One preferred embodiment is shown in FIG. 2. In this embodiment, the spread spectrum clock source is located in the control unit coupled to the data formatting unit and the clock circuit, both of which are further coupled to line drivers and receivers. The LED bar array is coupled to an LED driver that is further coupled to the line drivers and receivers by 16 data lines, a clock line and a strobe line. There may be multiple sets of LED drivers and LED bar arrays in one device.

In this embodiment, the spread spectrum is introduced at the control unit portion of the device. By locating the spread spectrum in the control unit, EMI emissions may be effectively reduced from the device's cabling as well as at the LED bar array.

In the claimed device, the greatest threat of EMI emissions results from the open construction of the LED bar array. In particular, the clock and data lines are long and exposed, therein making them ideal radiators of EMI emissions.

Figure 3:
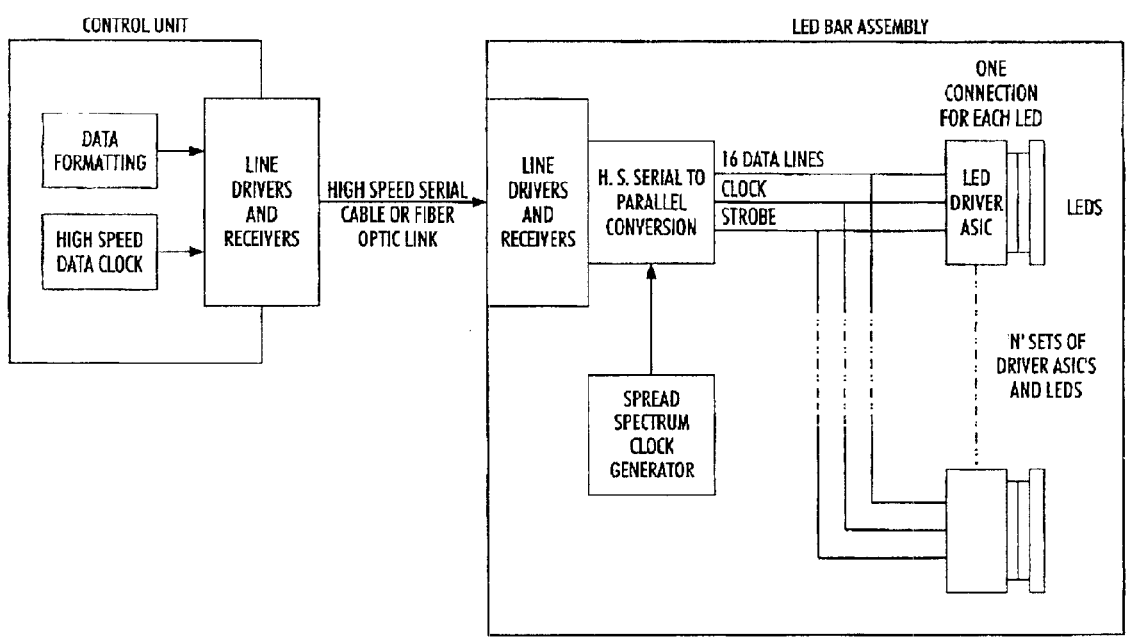
FIG. 3 is a block diagram describing a second embodiment wherein the spread spectrum clock source is coupled to the LED bar array.

Since the greatest threat of EMI emissions originates in the LED bar array, a second preferred embodiment comprises coupling the spread spectrum clock source in the LED bar assembly as shown in FIG. 3. In this arrangement, not all the EMI emissions from the overall device are reduced by spread spectrum, but the majority of total EMI emissions are reduced since the spread spectrum reduces EMI emissions from the LED bar array where the majority of EMI emissions in such a system originate.

In the claimed system, if the clock and data rates are ramped up and down in frequency during the strobe period, the data could be entered into the LED bar system at the same average rate and the strobe rate would not be affected. Typically, the strobe rate is less than about 100 KHz. In one example of the invention, a typical LED bar system may have 16 data lines. The clock and data rate may be 40 KHz, and the strobe pulse may be at 70 KHz.

In another embodiment, the clock would vary up and down at an asynchronous rate to the strobe pulse. However, the minimum data clock frequency would be greater than that to ensure that the data was entered into the LED bar system prior to the strobe pulse. Once the data transfer is complete, the clock would be stopped. Once the strobe pulse fires the LEDs, the clock and data would be resumed for the next strobe period.

What is claimed is:

1. A light emitting diode bar system comprising:
   an array of light emitting diodes on a substrate;
   a control unit coupled to the array of light emitting diodes, the control unit comprising a data formatting unit and a clock circuit that outputs a clock output signal that enables properly timed activation of individual light emitting diodes of the array of light emitting diodes;
   the control unit further including or coupled to a spread spectrum clock generator that generates the clock output signal, wherein the clock output signal has reduced amplitude electromagnetic interference spectral components such that electromagnetic interference emissions from the array of light emitting diodes are reduced.

2. The light emitting diode bar system according to claim 1, wherein the clock circuit is coupled to an oscillator that is coupled to the spread spectrum clock generator, wherein the oscillator generates a reference frequency signal such that the clock output signal generated by the spread spectrum clock generator has a fundamental frequency and reduced amplitude EMI spectral components at harmonics of the fundamental frequency.

3. The light emitting diode bar system according to claim 1, wherein the spread spectrum clock generator comprises:
   a clock pulse generator; and
   a spread spectrum modulator.

4. The light emitting diode bar system according to claim 3, wherein the spread spectrum modulator is a frequency modulator.

5. The light emitting diode bar system according to claim 4, wherein the frequency modulator is a profile modulator for modulating the clock pulse generator with a periodic waveform.

6. The light emitting diode bar system according to claim 3, wherein the spread spectrum modulator varies up and down at an asynchronous rate to a clock strobe pulse.

7. The light emitting diode bar system according to claim 1, wherein the system includes at least two arrays of light emitting diodes.

8. An image forming device including the light emitting diode bar system of claim 1, and further having an electrically chargeable photoreceptor on which a latent image of an original image is formed by the light emitting diode array, which latent image is subsequently developed with toner and then transferred to a transfer surface.

9. The image forming device according to claim 8, wherein the clock circuit is coupled to an oscillator that is coupled to the spread spectrum clock generator, wherein the oscillator generates a reference frequency signal such that the clock output signal generated by the spread spectrum clock generator has a fundamental frequency and reduced amplitude EMI spectral components at harmonics of the fundamental frequency.

10. The light emitting diode bar system according to claim 1, wherein the data formatting unit and the clock circuit are coupled to the array of light emitting diodes, and the spread spectrum clock generator is coupled to the data formatting unit and the clock circuit.

11. A light emitting diode bar system comprising:
   an array of light emitting diodes on a substrate;
   a control unit coupled to the array of light emitting diodes, the control unit comprising a data formatting unit and a clock circuit that outputs a clock output signal that enables properly timed activation of individual light emitting diodes of the array of light emitting diodes; and
   the array of light emitting diodes including or coupled to a spread spectrum clock generator that generates a spread spectrum output signal having reduced amplitude electromagnetic interference spectral components such that electromagnetic interference emissions from the array of light emitting diodes are reduced.

12. The light emitting diode bar system according to claim 11, wherein the spread spectrum clock generator comprises:
   a clock pulse generator; and
   a spread spectrum modulator.

13. The light emitting diode bar system according to claim 12, wherein the spread spectrum modulator is a frequency modulator.

14. The light emitting diode bar system according to claim 13, wherein the frequency modulator is a profile modulator for modulating the clock pulse generator with a periodic waveform.

15. The light emitting diode bar system according to claim 13, wherein the spread spectrum modulator varies up and down at an asynchronous rate to a clock strobe pulse.

16. An image forming device including the light emitting diode bar system of claim 11, and further having an electrically chargeable photoreceptor on which a latent image of an original image is formed by the light emitting diode array, which latent image is subsequently developed with toner and then transferred to a transfer surface.

17. The light emitting diode bar system according to claim 11, wherein the data formatting unit and the clock circuit are coupled to the array of light emitting diodes.

18. A method of reducing electromagnetic interference emissions from a light emitting diode bar system of an image forming device, wherein the light emitting diode bar system comprises an array of light emitting diodes on a substrate; and a control unit including or coupled to a data formatting unit and a clock circuit that outputs a clock output signal with reduced amplitude electromagnetic interference spectral components, the method comprising modulating a frequency of the clock circuit to spread electromagnetic emissions over a range of frequencies such that electromagnetic interference emissions from the array of light emitting diodes are reduced.

19. The method of reducing electromagnetic interference emissions from a light emitting diode bar system of an image forming device according to claim 18, wherein the frequency is modulated using a periodic waveform.

20. The method of reducing electromagnetic interference emissions from a light emitting diode bar system of an image forming device according to claim 18, wherein the frequency is modulated up and down at an asynchronous rate.

* * * * *